United States Patent [19]

Sanpei

[11] Patent Number: 5,748,793
[45] Date of Patent: *May 5, 1998

[54] QUICK IMAGE PROCESSOR OF REDUCED CIRCUIT SCALE WITH HIGH IMAGE QUALITY AND HIGH EFFICIENCY

[75] Inventor: Tatsuya Sanpei, Tokyo, Japan

[73] Assignee: NEC Corporation, Tokyo, Japan

[*] Notice: The term of this patent shall not extend beyond the expiration date of Pat. No. 5,396,291.

[21] Appl. No.: 312,511

[22] Filed: Sep. 26, 1994

[30] Foreign Application Priority Data

Sep. 28, 1993 [JP] Japan .................................. 5-240971

[51] Int. Cl.$^6$ .................................. G06K 9/36; G06K 9/46
[52] U.S. Cl. .................................. 382/251; 382/248; 348/405
[58] Field of Search .................................. 382/248, 250, 382/232, 233, 235, 249–253; 358/426–433; 364/715.02; 348/384, 385, 386, 390, 394, 395, 403–420, 435, 438, 440, 401

[56] References Cited

U.S. PATENT DOCUMENTS

| | | | |
|---|---|---|---|
| 5,070,397 | 12/1991 | Wedderburn-Bisshop | 358/22 |
| 5,224,062 | 6/1993 | McMillan | 364/725 |
| 5,255,216 | 10/1993 | Blanz | 364/757 |
| 5,321,522 | 6/1994 | Eschbach | 358/433 |
| 5,333,212 | 7/1994 | Ligtenberg | 382/250 |
| 5,396,291 | 3/1995 | Sanpei | 348/405 |
| 5,430,556 | 7/1995 | Ito | 358/427 |
| 5,452,104 | 9/1995 | Lee | 358/433 |
| 5,523,847 | 6/1996 | Feig | 358/261.3 |

FOREIGN PATENT DOCUMENTS

2-132972  5/1990  Japan .

Primary Examiner—Dwayne Bost
Assistant Examiner—Brian L. Johnson
Attorney, Agent, or Firm—Foley & Lardner

[57] ABSTRACT

A quick image processor of reduced circuit scale for carrying out compression and expansion of image data, including a quantization-inverse quantization device which executes a quantization of the image data using quantization steps corresponding to frequency components and an inverse quantization of decoded data using the quantization steps. The quantization-inverse quantization device includes a first shifter for executing a predetermined bit number shift of input data, an add-subtract device for adding or subtracting the output of the first shifter to or from the input data, a look-up table device for multiplying the input data by a multiple previously stored therein, and a second shifter for executing a predetermined bit number shift of either the output of the add-subtract device or the output of the look-up table device, resulting in carrying out ready IC fabrication and improving approximation accuracy of the quantization steps.

9 Claims, 4 Drawing Sheets

QUICK IMAGE PROCESSOR OF REDUCED CIRCUIT SCALE WITH HIGH IMAGE QUALITY AND HIGH EFFICIENCY

BACKGROUND OF THE INVENTION

The present invention relates to an image processor for carrying out coding and decoding of image data, and more particularly to an image processor for carrying out quantization and inverse quantization.

DESCRIPTION OF THE RELATED ART

Conventionally, in an image processor for carrying out compression and expansion of image data for image processing and image communication, in general, image data are divided into blocks and an orthogonal transform of the data is carried out for every block to output a transformation factor. Then the obtained transformation factors are quantized using a predetermined threshold value (hereinafter referred to as a "quantization step") and then the obtained quantization factors are coded.

Figure 1:
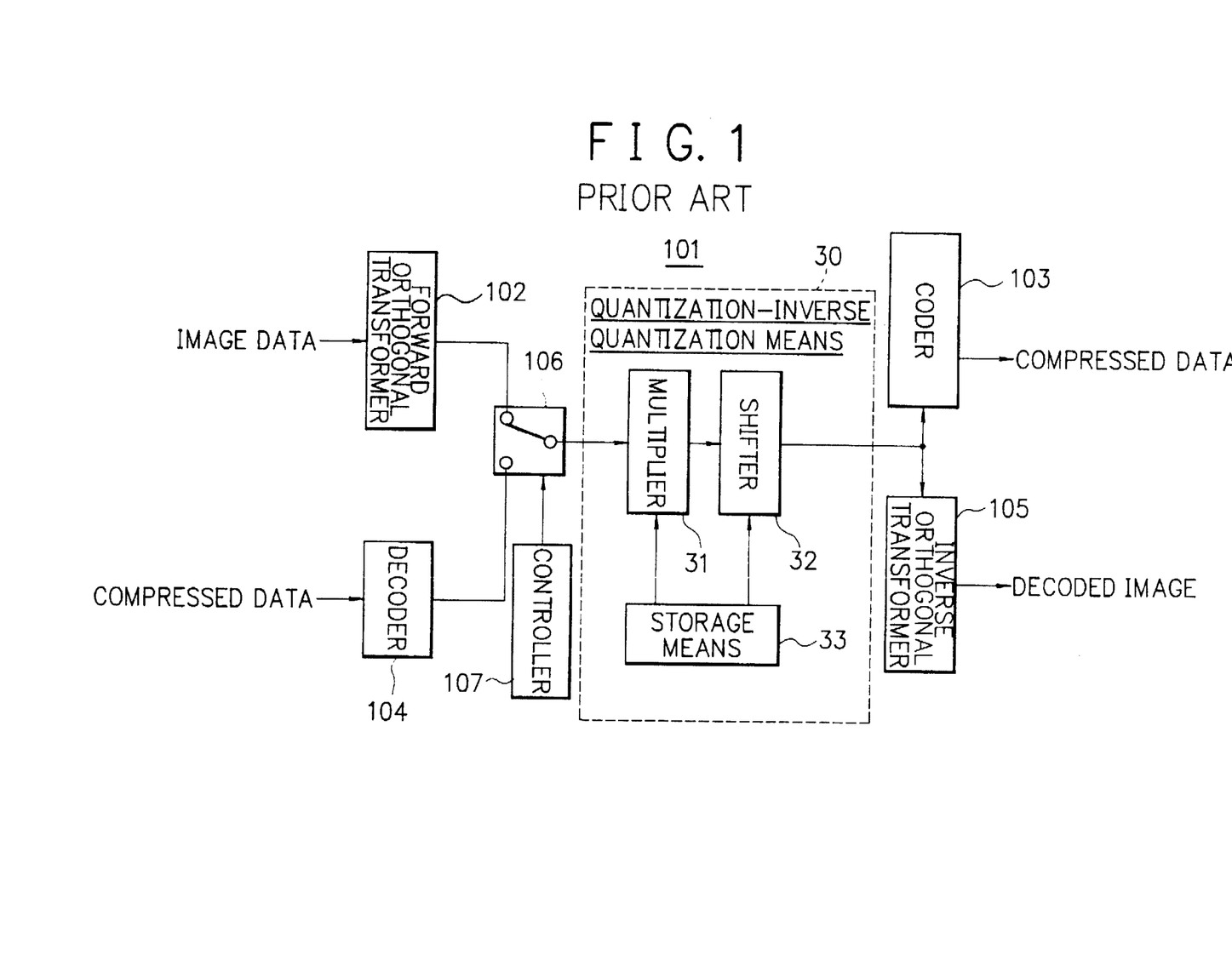
FIG. 1 is a block diagram of a first conventional image processor.

In FIG. 1, there is shown a first conventional image processor for compressing image data on the basis of this process. As shown in FIG. 1, the image processor 101, comprises a forward orthogonal transformer 102, a coder 103, a decoder 104, an inverse orthogonal transformer 105, a selector 106, a controller 107 and a quantization-inverse quantization means 30. The quantization-inverse quantization means 30 includes a multiplier 31, a shifter 32 and a storage means 33. The selector 106 selects either the output of the forward orthogonal transformer 102 in coding or the output of the decoder 104 in decoding to output the selected output to the quantization-inverse quantization means 30 while the controller 107 controls the selector 106.

The operation of the image processor 101 shown in FIG. 1 will now be described. First, in the coding, an orthogonal transform of digital image data input to the image processor 101 is carried out for every block composed of a plurality of pixels such as a matrix of 8×8 pixels in the forward orthogonal transformer 102 and the forward orthogonal transformer 102 outputs transformation factors. Then the obtained transformation factors are input to the quantization-inverse quantization means 30 via the selector 106 and the quantization-inverse quantization means 30 quantizes the transformation factors. Assuming the transformation factors are represented by Suv, when the block size is 8×8 pixels, the subscripts u and v indicating the position of the transformation factor S take values 0 to 7.

The transformation factors (Suv) output from forward orthogonal transformer 2 are quantized in quantization-inverse quantization means 30 by a quantization step (Quv), that is, by using a predetermined threshold value determined for every position of each factor or for every frequency component. The quantization is executed by multiplier 30 multiplying the transformation factor Suv by the reciprocal 1/Quv of the quantization step Quv, stored in the storage means 33.

The multiplication will be described in connection with FIG. 1. That is, in the storage means 33, the reciprocal 1/Quv of the quantization step, separated into a fixed-point part or mantissa and an exponent part, is stored. The mantissa is transferred to the multiplier 31 and the exponent part is to the shifter 32. In the multiplier 31, the transformation factors Suv are multiplied by the mantissa and the multiplication result is transferred to the shifter 32. In the shifter 32, a predetermined bit shift to the left or right is executed on the basis of the exponent part sent from the storage means 33.

Table 1 shows one example of a quantization matrix of a block size=8×8 pixels. In Table 1, numeric values represent quantization steps corresponding to frequency components. The quantization steps are usually determined according to visual sensitivity against the spatial frequencies and, as shown in Table 1, as to the high frequencies, the quantization can be carried out with large values.

TABLE 1

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

The quantization factors output from the quantization-inverse quantization means 30 are input to the coder 103 and in the coder 103, an entropy coding of the quantization factors is executed in order of their lower spatial frequency to output compressed data.

Next, in the decoding, compressed data input to the image processor 101 are decoded in the decoder 104 and the decoded data are transferred to the quantization-inverse quantization means 30 via the selector 106. Then, the quantization-inverse quantization means 30 executes the inverse quantization of the decoded data. That is, in the quantization-inverse quantization means 30, the inverse quantization is carried out by multiplying the decoded data by the quantization step Quv by means of the multiplier 31. On this occasion, no shift operation in the shifter 32 is executed. The output of the multiplier 31 is fed to the inverse orthogonal transformer 105, and an inverse transform of the data into a block of coded pixels composed of a predetermined number of pixels is carried out in the inverse orthogonal transformer 105, and all decoded blocks are synthesized in the inverse orthogonal transformer 105 to output a decoded image.

Figure 2:
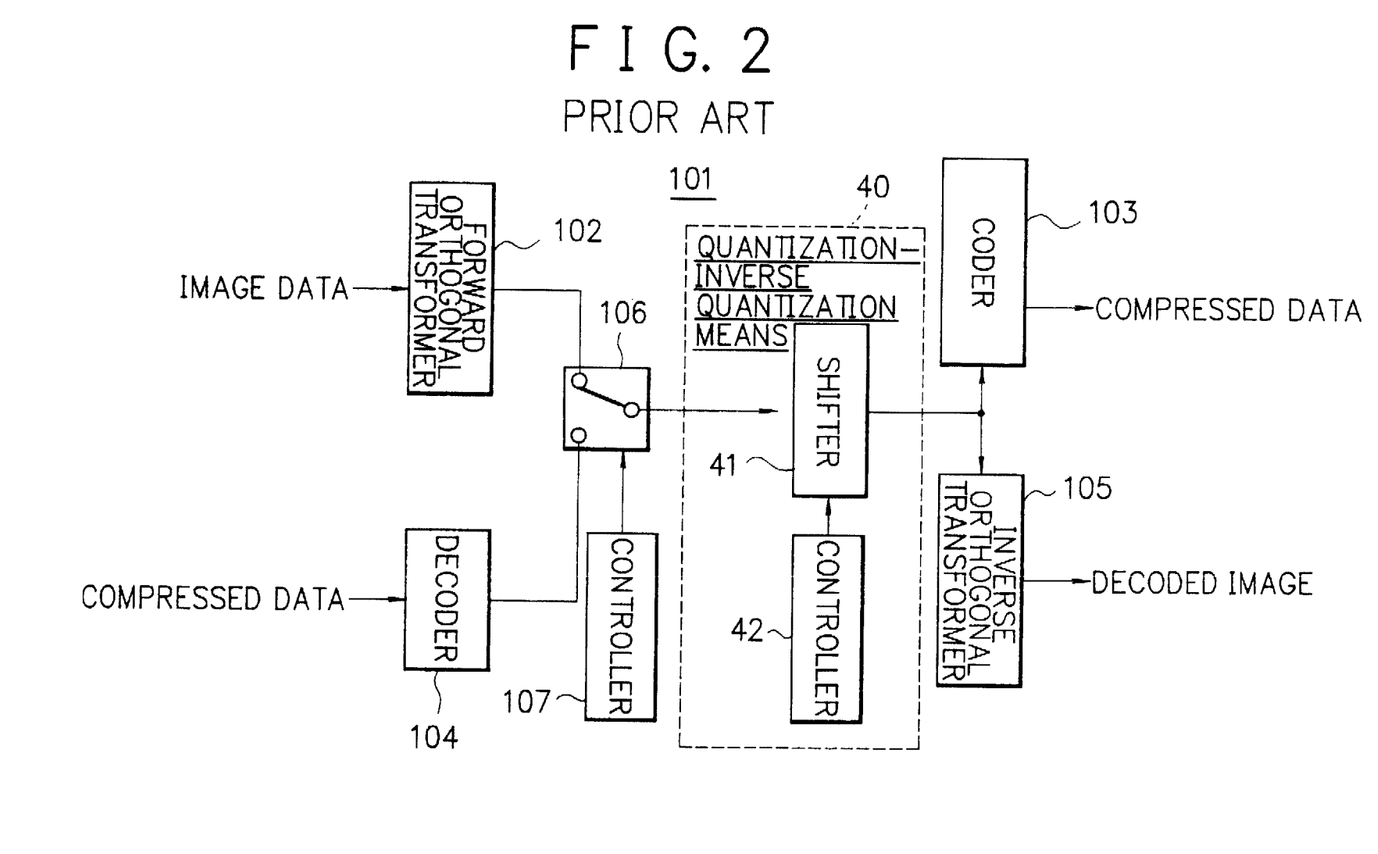
FIG. 2 is a block diagram of a second conventional image processor.

In FIG. 2, there is shown a second conventional image processor having the same construction as that of the above-described first conventional image processor shown in FIG. 1, except for a quantization-inverse quantization means 40 which includes a shifter 41 and a controller 42, and hence, the repeated description of the same parts as those of the first conventional image processor can be omitted for brevity.

In the same manner as the first conventional image processor, the image data are orthogonally transformed for every block in the forward orthogonal transformer 102 and the transformation factors are transferred to one input terminal of the selector 106. In turn, the compressed data are decoded in the decoder 104 and the decoded data are input to the other input terminal of the selector 106. Under the control of the controller 107, the selector 106 passes either the transformation factors or the decoded data to the quantization-inverse quantization means 40 depending on the coding or the decoding.

In this case, the quantization-inverse quantization means 40 approximates the quantization steps corresponding to the frequency component by an exponent of 2. For example, when the quantization is executed by quantization step 2, one bit right shift is made and, when the inverse quantization is conducted by quantization step 8, a three bit left shift is carried out in the shifter 41. The output of the shifter 41 is input to the coder 103 in the coding or to the inverse orthogonal transformer 105 in the decoding to output the compressed data from the coder 103 or the coded image from the inverse orthogonal transformer 105.

In the second conventional image processor, no multiplier for the quantization is required and the quantization or the inverse quantization is executed by only the shift operation. Accordingly, the circuit structure is simplified and fast operational speed can be attained.

In the first conventional image processor, in the coding operation, the multiplier 31 multiplies the transformation factor Suv by the factor position of this factor stored in the storage means 33, that is, the reciprocal of the quantization step corresponding to the frequency component and the bit shift of the multiplication result is then executed in the shifter 32 to perform the quantization.

However, in the first conventional image processor, the storage means 33 for storing the reciprocal of the quantization step is required. Also, the multiplier 31 has a complicated and large-scale circuit structure. Hence, the circuit scale of the whole quantization-inverse quantization means increases and as a result, it is difficult to make its semiconductor integrated circuit (hereinafter referred to as "IC fabrication"). Further, it takes a long time to carry out the multiplication and it is difficult to shorten the time required for the coding and decoding processing.

In order to solve these problems, the second conventional image processor has been developed. In this case, as disclosed in Japanese Patent Laid-Open Publication No. 2-132972, the quantization step is approximated by the exponent of 2 and by the bit shift operation, the quantization is executed.

However, in this second conventional image processor, the quantization step determined corresponding to the frequency component is restricted to only the exponent of 2, and the number of the selectable quantization steps is small. Also, in a large quantization step area, the interval between the quantization steps is difficult. Hence, when the multiplier in the quantization-inverse quantization means is replaced with the shifter, the image quality of the decoded image degrades and the coding efficiency falls.

SUMMARY OF THE INVENTION

Accordingly, it is an object of the present invention to provide an image processor in view of the aforementioned problems of the prior art, which is capable of reducing the circuit scale necessary to prepare IC fabrication, reducing calculation time required for coding and decoding, increasing the number of quantization steps, and readily changing combinations of the quantization steps.

In order to achieve this object, according to the present invention, an image processor for carrying out a compression and an expansion of image data, comprises forward orthogonal transforming means for carrying out an orthogonal transform of image data for every data block to output first data; decoding means for decoding compressed data to output second data; quantization-inverse quantization means for carrying out either a quantization of the first data using quantization steps according to frequency components in the coding to output third data or an inverse quantization of the second data using the quantization steps in the decoding to output fourth data; coding means for coding the third data to output compressed data; and inverse orthogonal transforming means for carrying out an inverse orthogonal transform of the fourth data to output a decoded image, the quantization-inverse quantization means including first shifting means for carrying out a predetermined bit number shift of the input data fed to the quantization-inverse quantization means; add-subtract means for either adding or subtracting an output of the first shifting means to or from the input data; look-up table means for multiplying the input data by a multiple; and second shifting means for carrying out a predetermined bit number shift of an output of either the add-subtract means or the look-up table means.

The quantization-inverse quantization means can further include selecting means for selecting either the output of the add-subtract means or the output of the look-up table means, the output of the selecting means being input to the second shifting means. Multiples resulting from multiplying input data have been stored in the look-up table as either of the following forms:

$$2^c/(2^a+1) \text{ or } 2^c/(2^a-1),$$

where "a" is the predetermined bit shift number of the input data in the first shift means and "c" represents a predetermined integer.

The quantization-inverse quantization means can further include control means for setting a control signal for the first shifting means so as to shift the data by a predetermined bit number according to the quantization step corresponding to the frequency component and the coding or the decoding; control means for controlling the selection of either addition or subtraction in the add-subtract means; and control means for controlling a setting of a shifting direction and a bit shift number in the second shifting means.

The look-up table means can include a plurality of look-up table devices for carrying out the respective constant multiple multiplications and the look-up table devices are connected in cascade.

According to the present invention, an image processing method for carrying out a compression and an expansion of image data, comprises a forward orthogonal transforming step for carrying out an orthogonal transform of image data for every block to output first data; a decoding step for decoding compressed data to output second data; a quantizing-inverse quantizing step for carrying out either a quantization of the first data using quantization steps according to frequency components in the coding to output third data or an inverse quantization of the second data using the quantization steps in the decoding to output fourth data; a coding step for coding the third data to output compressed data; and an inverse orthogonal transforming step for carrying out an inverse orthogonal transform of the fourth data to output a decoded image, the quantizing-inverse quantizing step including a first shifting step for carrying out a predetermined bit number shift of the input data fed in the quantizing-inverse quantizing step; an add-subtract step for either adding or subtracting an output of the first shifting step to or from the input data; a look-up table step for multiplying the input data by a multiple; and a second shifting step for carrying out a predetermined bit number shift of an output of either the add-subtract step or the look-up table step.

The image processor of the present invention has the construction described above. The multiples in the look-up table devices in the look-up table means in the quantization-inverse quantization means are constants which are composed of a denominator having a value 2a+1 or 2a−1, the factors to be produced by the first shifting means for carrying out a bit "a" shift of the input data and the add-subtract means, and a numerator of an exponent of 2 so as to deal with both the quantization and the inverse quantization processings result in increasing the number of the different selectable quantization steps and ensure approximate accuracy of the quantization steps.

In the quantization, for example, one bit right shift of the input data is executed by the first shifting means according to the predetermined quantization step, and the obtained value is added to the input data (3/2 times the input data), and the bit "b" shift of the addition result is carried out by the second shifting means to output the obtained value. This corresponds to the quantization of the input data using the quantization step $2^{b+1}/3$. When the inverse quantization is carried out using this quantization step, no factor having a denominator of 3 can be produced from only the combination of the shifting means and the add-subtract means.

In the image processor according to the present invention, the quantization-inverse quantization means includes the shifting means, the add-subtract means and the look-up table means and when the decoded data are inversely quantized using the quantization step $2^{b+1}/3$, the decoded data are input to the look-up table means with a constant multiple composed of a denominator of 3 and a numerator of an exponent of 2 such as ⅔. And the output value of the input data by ⅔ times is input to the second shifting means via the selecting means and the "b" bit shift to the left is executed in the second shifting means.

Further, in the predetermined quantization step, in order to improve the approximation accuracy, the look-up table means can be selected in place of the first shifting means and the add-subtract means even in the quantization execution and on the contrary, when the inverse quantization is executed using this quantization step, the first shifting means and the add-subtract means are selected.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 3:
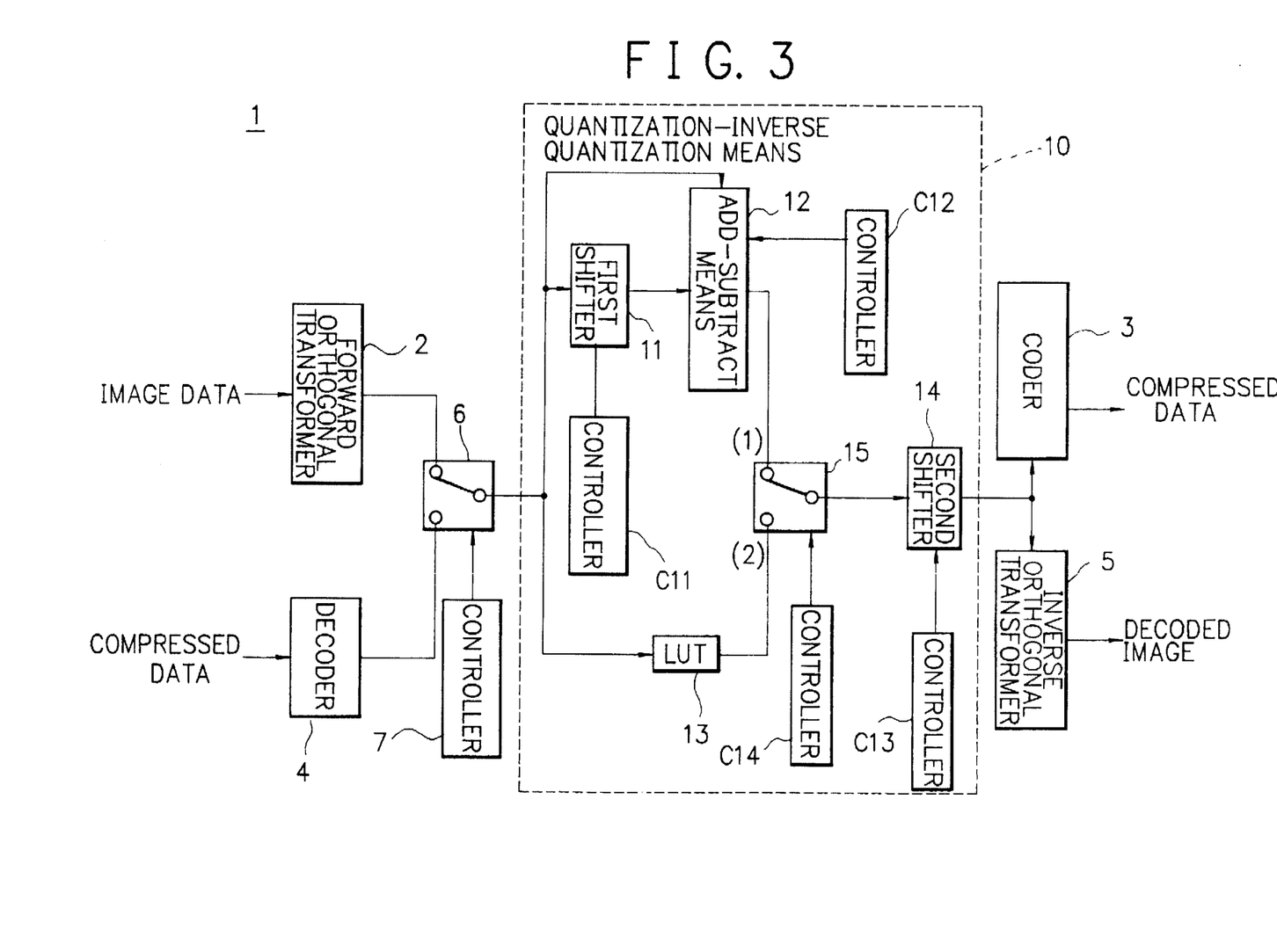
FIG. 3 is a block diagram of a first embodiment of an image processor according to the present invention.

Referring now to the drawings, wherein like reference characters designate like or corresponding parts throughtout the views and thus the repeated description thereof can be omitted for brevity, there is shown in FIG. 3 the first embodiment of an image processor according to the present invention.

As shown in FIG. 3, the image processor 1 comprises a forward orthogonal transformer 2, a coder 3, a decoder 4, an inverse orthogonal transformer 5, a selector 6, a controller 7 and a quantization-inverse quantization means 10.

The forward orthogonal transformer 2 is a processing part for image data which divides the input image data into predetermined block units and execute an orthogonal transform of the data for every block unit. For example, in the forward orthogonal transformer 2, the image data are orthogonally transformed into a plurality of pixel blocks of a matrix of 8×8 pixels to output transformation factors. As the orthogonal transform, for example, a discrete cosine transform (hereinafter referred to as "DCT") is used.

The coder 3 is a functional part for carrying out an entropy coding from the lower spatial frequency to output compressed data. As the entropy coding, for example, Haffman coding is used.

The decoder 4 is a functional part for processing expansion of compressed data input.

The expanded data from decoder 4 is inverse quantized or dequantized by means 10 and then inverse orthogonal transformer 5 executes an inverse transform to output a decoded image. The inverse orthogonal transformer 5 is preferably composed of a DCT circuit and an inverse discrete cosine transform (IDCT) circuit. In the inverse orthogonal transformer 5, the input image data are inversely transformed into coded pixel blocks of a predetermined number of pixels and all decoded blocks are synthesized to output a decoded image.

The selector 6 is a line switch and its switching operation is controlled by the controller 7.

The controller 7 is a functional part for controlling the line switch operation of the selector 6. The controller 7 controls to allow the selector 6 to pass either the transformation factors output from the forward orthogonal transformer 2 or the decoded data output from the decoder 4 to the quantization-inverse quantization means 10.

The quantization-inverse quantization means 10 is a functional part having the quantization and inverse quantization functions or devices. In the quantization-inverse quantization means 10, the quantization is a quantizing of the image data as the transformation factors by a predetermined threshold value (hereinafter referred to as "quantization step" and quantized factors are coded. Also, the inverse quantization is carried out by multiplying the coded data by the quantization step.

The quantization-inverse quantization means 10 includes a first shifter 11, an add-subtract means 12, an LUT (look-up table) 13, a second shifter 14, a selector 15 and four controllers C11 to C14 for controlling the first shifter 11, the add-subtract means 12, the second shifter 14 and selector 15.

In the quantization-inverse quantization means 10, the output of the selector 6 is input to the first shifter 11, one input terminal of the add-subtract means 12 and the LUT 13 and the output of the first shifter 11 is fed to another input terminal of the add-subtract means 12. The output of the add-subtract means 12 is input to one input terminal of the selector 15 and the output of the LUT 13 is input to another input terminal of the selector 15. The output of the selector 15 is fed to the second shifter 14 to execute a predetermined bit number shift therein and the output of the second shifter 14 as the output of the quantization-inverse quantization means 10 is input to the coder 3 and the inverse orthogonal transformer 5.

The LUT 13 is a table reference type of constant number multiplier for outputting a value of constant times with respect to the input data. Preferably, the LUT 13 can be produced by a ROM (read only memory) to be addressed on the basis of the value of the input data. In this case, in response to a negative output of the forward orthogonal transformer 2, addressing to the LUT 13 via an absolute value circuit (not shown) for the input data can be carried out.

Next, the operation of the first embodiment of the image processor according to the present invention will now be described.

First, either the transformation factors as the output of the forward orthogonal transformer 2 or the decoded data as the output of the decoder 4 is input to the quantization-inverse quantization means 10 via the selector 6. The input data are fed to the first shifter 11, the add-subtract means 12 and the LUT 13.

The controller C11 determines a control signal for the first shifter 11 so that the first shifter 11 may shift the input data a predetermined bit number determined according to the quantization step corresponding to the frequency component of the quantization object and the coding or decoding.

The output of the first shifter 11 is input to the add-subtract means 12 in which the output of the first shifter 11 is added to or subtracted from the input data supplied to another input terminal. The controller C12 controls the add-subtract means 12 to select either the addition or the subtraction according to the quantization step corresponding to the frequency component and the coding or the decoding.

The selector 15 selects either the output (line (1)) of the add-subtract means 12 or the output (line (2)) of the LUT 13 according to the quantization step corresponding to the frequency component and the coding or the decoding while the selector 15 is controlled by the controller C14.

The second shifter 14 executes a predetermined bit number shift to the left or right of the output of the selector 15 according to the quantization step corresponding to the frequency component and the coding or the decoding while the controller C13 controls the second shifter 14.

The output of the second shifter 14 is fed to the coder 3 in the coding or to the inverse orthogonal transformer 5 in the decoding processing. Then, the coder 3 codes the output of the second shifter 14 to output the compressed data in the coding processing and the inverse orthogonal transformer 5 carries out the inverse orthogonal transform of the output of the second shifter 14 to output the decoded image in the decoding processing.

Table 2 shows factors obtainable in the quantization-inverse quantization means 10 along with control information of other members for realizing these factors in the case where one bit right shift is constantly executed in the first shifter 11, and a variable bit number shift to the left or right within a range of 8 bits is conducted in the second shifter 14, and a multiple is determined to a constant number ⅔ in the LUT 13. In this case, the factors represent ratios against the input data and correspond to the reciprocals of the quantization steps or the quantization steps.

TABLE 2

| A | | L1 | L2 | L3 | L4 | L5 | L6 | L7 | L8 |
|---|---|----|----|----|----|----|----|----|----|
| B | (1) − | 1 | 2 | 4 | 8 | 16 | 32 | 64 | 128 |
|   |       | I 3 | I 6 | I 12 | I 24 | I 48 | I 96 | I 192 |    |
|   | (2)   | I   | I   | I    | I    | I    | I    | I    | I  |
|   |       | 4/3 | 8/3 | 16/3 | 32/3 | 64/3 | 128/3 | 256/3 | 512/3 |
| 0 | R1 | R2 | R3 | R4 | R5 | R6 | R7 | R8 |
| F | F | F | F | F | F | F | F | F |
| ½ | ¼ | ⅛ | 1/16 | 1/32 | 1/64 | 1/128 | | |
| F | F | F | F | F | F | F | F | F |
| ¾ | ⅜ | 3/16 | 3/32 | 3/64 | 3/128 | 3/256 | 3/512 | |
| F | F | F | F | F | F | F | F | F |
| ⅔ | ⅓ | ⅙ | 1/12 | 1/24 | 1/48 | 1/96 | 1/192 | |

In Table 2, a column attached with a symbol F shows that the quantization is executed using a reciprocal of the numeric value in its column as a quantization step and a column attached with a symbol I indicates that the inverse quantization is carried out using the numeric value in its column as the quantization step.

In the row A in Table 2, a shift direction and a bit shift number in the second shifter 14 shown in FIG. 3 are shown, and the symbols L and R represent the respective left and right shifts, and the numeric value represents the bit shift number. Also, a number 0 in the row A indicates that the second shifter 14 does not execute the shifting operation.

Further, in the row B, signs (1) and (2) represent the connections with the respective lines (1) and (2) of the selector 15 shown in FIG. 3. Also, in row (1), the symbol − indicates the subtraction and the symbol + the addition in the add-subtract means 12. As shown in Table 2, in this embodiment, the subtraction in the add-subtract means 12 subtracts the output of the first shifter 11 from the input data.

The quantization matrix shown in Table 1 is replaced with the numeric values shown in Table 2 to obtain an approximated quantization matrix shown in Table 3. In Table 3, fractions 0.05 and over are counted as a unit and the rest is cut away in all numeric values.

TABLE 3

| 16.0 | 10.7 | 10.7 | 16.0 | 24.0 | 42.7 | 48.0 | 64.0 |
|------|------|------|------|------|------|------|------|
| 12.0 | 12.0 | 12.0 | 21.3 | 24.0 | 64.0 | 64.0 | 48.0 |
| 12.0 | 12.0 | 16.0 | 24.0 | 42.7 | 64.0 | 64.0 | 64.0 |
| 12.0 | 16.0 | 21.3 | 32.0 | 48.0 | 85.3 | 85.3 | 64.0 |
| 16.0 | 24.0 | 32.0 | 48.0 | 64.0 | 96.0 | 96.0 | 85.3 |
| 24.0 | 32.0 | 48.0 | 64.0 | 85.3 | 96.0 | 128.0 | 96.0 |
| 48.0 | 64.0 | 85.3 | 85.3 | 96.0 | 128.0 | 128.0 | 96.0 |
| 64.0 | 96.0 | 96.0 | 96.0 | 96.0 | 96.0 | 96.0 | 96.0 |

More specifically, about the quantization matrix shown in Table 3, a quantization operation and an inverse quantization operation to determine a quantization step to 96.0 will be described. In this case, it is understood from Table 3, that the quantization step 96.0 corresponds to the quantization at the factor positions (u, v)=(7, 1 to 7) and (6, 4) representing the frequency component with respect to the transformation factor Suv as the output of the forward orthogonal transformer 2.

First, in the case of the quantization, in Table 2, referring to the column with the symbol F containing the reciprocal 1/96 of the quantization step, A=R6 and B=(2) are determined. That is, R6 means 6 bit right shift in the second shifter 14 and (2) of B means a selection of the input terminal (2) in the selector 15.

Hence, for example, when the transformation factor S71 is quantized, the controller C14 switches the input terminal of the selector 15 to (2) and the controller C13 sets the second shifter 14 to carry out the 6 bit right shift. The data flow in the quantization turns out as follows:

1) The data input to the quantization-inverse quantization means 10 are fed to the LUT 13 and the LUT 13 outputs the data of ⅔×input data.

2) The output of the LUT 13 is connected to the input terminal (2) and thus the ⅔×input data are input to the second shifter 14 via the selector 15.

3) The 6 bit right shift of the input data is executed in the second shifter 14.

In this case, an n bit right shift of data corresponds to a division of the data by the n-th power of 2 and an n bit left shift of data to a multiplication of the data by the n-th power of 2. Hence, in the 6 bit right shift of the data in 3) is equal to 1/64×the data and the data input to the quantization-inverse quantization means 10 are finally multiplied as (⅔)×(1/64) times. That is, the input data multiplied by 1/96 are output and the input data to the quantization-inverse quantization means 10 are quantized by quantization step 64.

Next, in the case of the inverse quantization, for example, the data decoded in the decoder 4 by quantization step 96, referring to the column attached with the symbol I with its numeric value 96 in Table 2, A=L6 and B=(1)+are determined. Hence, the controller C13 controls the second shifter 14 to execute 6 bit left shift of the data, the controller C14 controls selector 15 to switch the input terminal to line (1), and the controller C12 controls the add-subtract means 12 to switch to the addition of the input data to the output of the first shifter 11. Accordingly, the data flow in this inverse quantization is as follows:

1) One bit right shift of the data input to the quantization-inverse quantization means 10 is carried out in the first shifter 11. That is, the data are multiplied by ½.
2) The one bit right shifted data are added to the input data in the add-subtract means 12. That is, the data are multiplied by 3/2.
3) The output of the add-subtract means 12 is input to the second shifter 14 via line (1) of the selector 15.
4) The 6 bit left shift of the data is executed in the second shifter 14, that is, the data are multiplied by 64.

Hence, the data input to the quantization-inverse quantization means 10 are finally multiplied as (½+1)×64 times, that is, multiplied by 96 and are output. Thus, the input data are inversely quantized by quantization step 64.

The other cases except the case of quantization step 96 are processed in the same manner as the above-described procedure. That is, the transformation factors or the decoded data input to the quantization-inverse quantization means 10 are processed under their setting conditions of the add-subtract means 12, the second shifter 14 and the selector 15. These setting conditions are set by determining the predetermined control information in Table 2 in the add-subtract means 12, the second shifter 14 and the selector 15 by the controllers C12 to C14 so that the quantization or the inverse quantization may be carried out corresponding to the frequency components of the input data.

Figure 4:
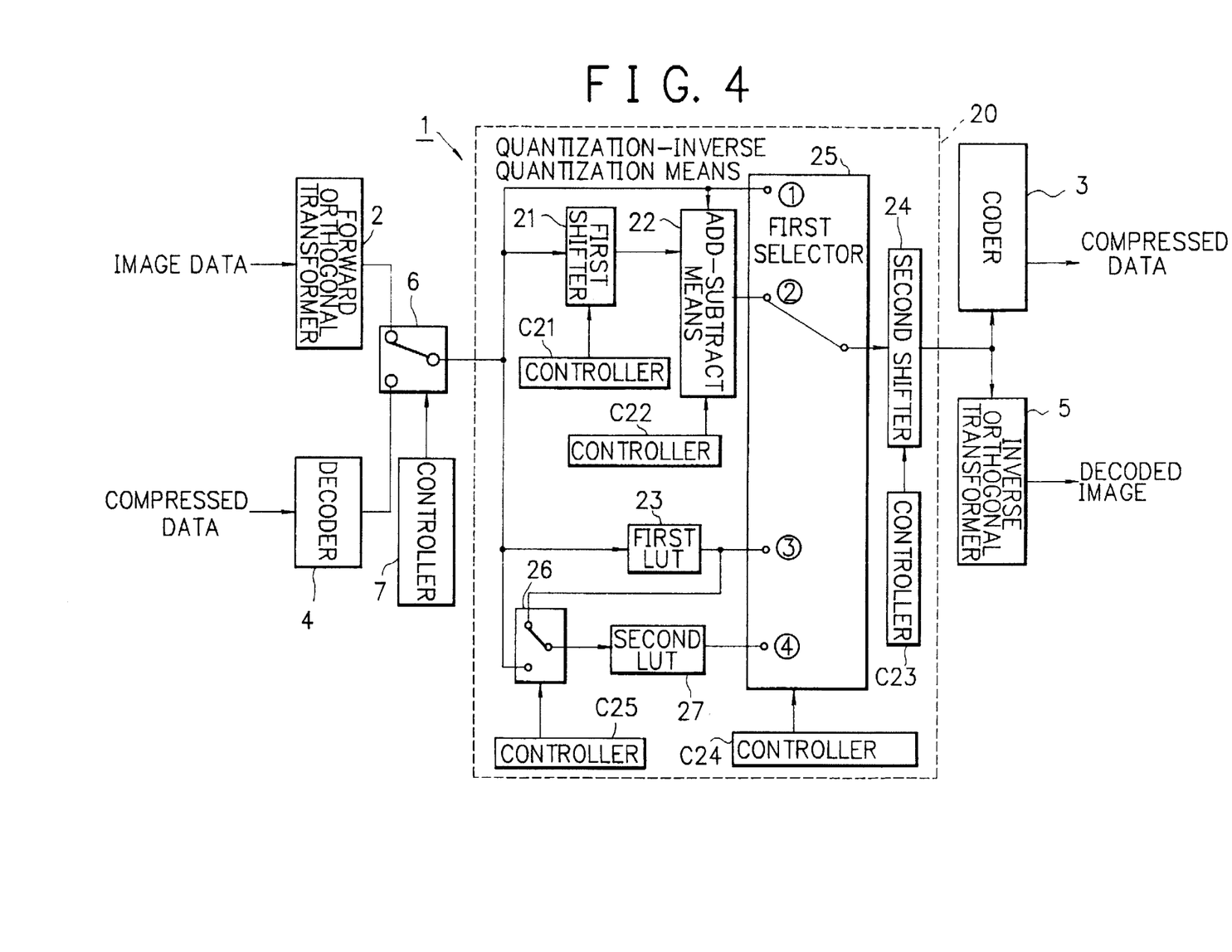
FIG. 4 is a block diagram of a second embodiment of an image processor according to the present invention.

FIG. 4 illustrates the second embodiment of an image processor according to the present invention. In this embodiment, the forward orthogonal transformer 2 and the inverse orthogonal transformer 5 can be preferably implemented by a discrete cosine transform (DCT) circuit and an inverse discrete cosine transform (IDCT) circuit, respectively. The description of the same parts as those of the first embodiment can be omitted for brevity.

As shown in FIG. 4, in this embodiment, a quantization-inverse quantization means 20 in the image processor 1 includes a first shifter 21, an add-subtract means 22, a first LUT 23, a second shifter 24, a first selector 25, a second selector 26, a second LUT 27 and controllers C21 to C25.

The first shifter 21 executes a data right shift of a predetermined bit number determined according to the quantization step corresponding to the frequency component and the coding or the decoding while the controller C21 controls the first shifter 21. The add-subtract means 22 selects either an addition or a subtraction according to the quantization step corresponding to the frequency component and the coding or the decoding while the controller C22 controls the add-subtract means 22.

The second selector 26 selects either the output of the selector 6 or the output of the first LUT 23 according to the quantization step corresponding to the frequency component and the coding or the decoding while the controller C25 controls the second selector 26. The output of the second selector 26 is fed to the second LUT 27.

The first selector 25 selects one of the input data (line (1)), the output of the add-subtract means 22 (line (2)), the output of the first LUT 23 (line (3)), and the output of the second LUT 27 (line (4)) according to the quantization step corresponding to the frequency component and the coding or the decoding while the controller C24 controls the first selector 25.

The second shifter 24 executes a predetermined bit number data shift to the left or right according to the quantization step corresponding to the frequency component and the coding or the decoding while the controller C23 controls the second shifter 24.

In this embodiment, the multiples of the first and second LUTs 23 and 27 are suitably set and these two first and second LUTs 23 and 27 can be connected in cascade in multistages by selecting the input line of the second selector 26. Hence, by switching the first selector 25 and the second LUT 27, one of the output of the first LUT 23, the output of the second LUT 27 and the output of the cascade multistage connection of the first and second LUTs 23 and 27 can be selected. That is, by using two LUTs, an equivalent operation to the case where three LUTs are coupled in parallel can be realized. For example, in the case where the first LUT 23 is set to 4/3 times and the second LUT 27 to 4/5 time, any one of the values 4/3, 4/5 and these multiplied value 16/15 can be selected.

In this embodiment, in the quantization-inverse quantization means 20, when the first shifter 21 is set to a right shift within a range of 4 bits, the second shifter 24 to a left or right shift within a range of 8 bits, the first LUT 23 to a multiple of a constant 4/3 and the second LUT 27 to a multiple of a constant 4/5, the quantization-inverse quantization means 20 can realize factors shown in Table 4.

TABLE 4

| A   |     |    | L1    | L2    | L3     | L4     | L5     | L6      | L7      | L8     |
|-----|-----|----|-------|-------|--------|--------|--------|---------|---------|--------|
| B   | (1) |    | I 2   | I 4   | I 8    | I 16   | I 32   | I 64    | I 128   |        |
|     | (2) | 2− | I 3/2 | I 3   | I 6    | I 12   | I 24   | I 48    | I 96    | I 192  |
|     |     | 2+ | I 5/2 | I 5   | I 10   | I 20   | I 40   | I 80    | I 160   |        |
|     |     | 4− | I     | I     | I      | I      | I      | I       | I       | I      |
|     |     |    | 15/8  | 15/4  | 15/2   | 15     | 30     | 60      | 120     | 240    |
|     | (3) |    | I     | I     | I      | I      | I      | I       | I       |        |
|     |     |    | 8/3   | 16/3  | 32/3   | 64/3   | 128/3  | 256/3   | 512/3   |        |
|     | (4) | (5)| I     | I     | I      | I      | I      | I       | I       | I      |
|     |     |    | 8/5   | 16/5  | 32/5   | 64/5   | 128/5  | 256/5   | 512/5   | 1024/5 |
|     |     | (6)| I     | I     | I      | I      | I      | I       | I       |        |
|     |     |    | 32/15 | 64/15 | 128/15 | 256/15 | 512/15 | 1024/15 | 2048/15 |        |

TABLE 4-continued

| 0 | R1 | R2 | R3 | R4 | R5 | R6 | R7 | R8 |
|---|---|---|---|---|---|---|---|---|
| I | F 1/2 | F 1/4 | F 1/8 | F 1/16 | F 1/40 | F 1/64 | F 1/128 | |
| F 3/4 | F 3/8 | F 3/16 | F 3/32 | F 3/64 | F 3/128 | F 3/256 | F 3/512 | |
| I 5/4 | F 5/8 | F 5/16 | F 5/32 | F 5/64 | F 5/128 | F 5/256 | I 5/512 | F 5/1024 |
| F 15/16 | F 15/32 | F 15/64 | F 15/128 | F 15/256 | F 15/512 | F 15/1024 | F 15/2048 | F |
| I | F | F | F | F | F | F | F | F |
| 1/3 | 3/2 | 1/3 | 1/6 | 1/12 | 1/24 | 1/48 | 1/96 | 1/192 |
| F | F | F | F | F | F | F | F | |
| 4/5 | 2/5 | 1/5 | 1/10 | 1/20 | 1/40 | 1/80 | 1/160 | |
| I | F | F | F | F | F | F | F | F |
| 16/15 | 8/15 | 4/15 | 2/15 | 1/15 | 1/30 | 1/60 | 1/120 | 1/240 |

In Table 4, similar to Table 2 described above, in a column attached with symbol F, a quantization using a reciprocal of its numeric value as a quantization step is executed and in a column attached with the symbol I, an inverse quantization using its numeric value as a quantization step is performed.

In Table 4, the row A represents the shift control of the second shifter 24 shown in FIG. 4, and the symbols L and R indicate the respective left or right shits, and the numeric values represent the bit shift numbers. Also, in the row B, (1), (2), (3) and (4) indicate the selection of respective lines (1), (2), (3) and (4) in the first selector 25 shown in FIG. 4, and in the row B (2), the values 2−, 2+ and 4+ represent the right bit shift numbers in the first shifter 21, and the signs − and + show the addition and the subtraction in the add-subtract means 22. In the row B (4), (5) and (6) represent the input lines (5) and (6) of the second selector 26.

As apparent from Table 4, in the quantization-inverse quantization means 20, by giving the two LUTs, the number of the selectable quantization steps can be largely increased and the approximation accuracy of the quantization steps of the quantization matrix can be improved.

When the quantization-inverse quantization means 20 quantizes the transformation factors as the input data or inversely quantizes the decoded data, the controllers C21 to C25 set the control information shown in Table 4 to the first shifter 21, the add-subtract means 22, the second shifter 24, the first selector 25 and the second selector 26 according to the quantization step corresponding to the frequency component and the coding or the decoding.

In the embodiments of the image processor according to the present invention, the quantization-inverse quantization means includes the shifters, the add-subtract means and the LUT as the table reference constant multiplication means and its circuit scale can be reduced to achieve a ready IC fabrication in comparison with the conventional quantization-inverse quantization means including the multiplier and the storage means for storing the reciprocals of the quantization steps.

As one example, in the quantization-inverse quantization means having an input and output data width of 8 bits and the quantization steps of 8 bits, when a calculation of a gate number of the circuit structure (one bit right shift in the first shifter 11, the left and right shift within an 8 bit range in the second shifter 14 and the multiple of the constant ⅔ in the LUT 13) of the first embodiment of the present invention is tried and the obtained gate number is compared with the first conventional image processor, the gate number of the quantization-inverse quantization means in the first embodiment of the present invention is approximately 2000 compared with approximately 3000 in the first conventional quantization-inverse quantization means 30 and thus it is readily understood that the gate number of the present quantization-inverse quantization means is reduced to approximately 70% compared with the conventional quantization-inverse quantization means. This result proves the advantages of the present invention which is capable of greatly reducing the gate number.

Also, in the embodiments of the present invention, the number of the selectable quantization steps can be increased and the interval between the selectable quantization steps can be determined even in a large quantization step area. Hence, the quantization steps variable for every frequency component can be approximated with a high degree of accuracy.

Further, in the embodiments of the present invention, by changing the control information shown in Table 2 and Table 3, the quantization steps of the quantization-inverse quantization means can readily be changed.

As described above, in an image processor according to the present invention, since a quantization-inverse quantization means includes shifters, an add-subtract means and a LUT, its circuit scale can be reduced and its IC fabrication can readily be achieved. Also, in the image processor of the present invention, since the multiplier is not used, the high speed calculation operation in the quantization or the inverse quantization can be attained and thus the processing time of the coding and decoding can be reduced. Further, the quantization in the quantization-inverse quantization is not restricted to only the exponent of 2 and the number of the selectable quantization steps can be increased. As a result, the interval between the selectable quantization steps in the large quantization step area can be set to be small.

Moreover, since the look-up table is used for the constant multiple of the input data, the approximation accuracy of the selectable quantization steps can be improved and the change of the contents in the combinations can readily be carried out by rewriting. Hence, the quantization matrix suitable to the image characteristics can readily be produced.

From the synthesis of the above various improving points, the quality degradation of the decoded image can be prevented and the coding operation with high coding efficiency can be carried out.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image processor carrying out a compression and an expansion of image data, comprising:

forward orthogonal transforming means for carrying out an orthogonal transform of image data for every data block to output first data;

decoding means for decoding compressed data to output second data;

quantization-inverse quantization means for carrying out either a quantization of the first data using quantization steps according to frequency components for coding to output third data or an inverse quantization of the second data using the quantization steps for decoding to output fourth data;

coding means for coding the third data to output compressed data; and inverse orthogonal transforming means for carrying out an inverse orthogonal transform of the fourth data to output a decoded image, the quantization-inverse quantization means including first shifting means for carrying out a predetermined bit number shift of input data fed to the quantization-inverse quantization means;

add-subtract means for either adding or subtracting an output of the first shifting means to or from the input data;

look-up table means for storing multiplied input data according to a multiple determined by the predetermined bit number shift of the first shifting means and the adding or the subtracting of the add-subtract means; and second shifting means for carrying out a predetermined bit number shift of an output of either the add-subtract means or the look-up table means.

2. The image processor as claimed in claim 1, wherein the quantization-inverse quantization means further includes selecting means for selecting either the output of the add-subtract means or the output of the look-up table means, an output of the selecting means being input to the second shifting means.

3. The image processor as claimed in claim 1, wherein the multiple of the input data is read from the look-up table means in the quantization or the inverse quantization process with respect to a bit shift number "a" of the input data of the first shifting means in the inverse quantization or the quantization process as either form, wherein "c" represents a predetermined integer, as follows $$2^c/(2^a+1) \text{ or } 2^c/(2^a-1).$$

4. The image processor as claimed in claim 1, wherein the quantization-inverse quantization means further includes control means for setting a control signal to the first shifting means so as to shift the data by a predetermined bit number according to a quantization step corresponding to a frequency component and the coding or the decoding.

5. The image processor as claimed in claim 1, wherein the quantization-inverse quantization means further includes control means for controlling the selection of either addition or subtraction in the add-subtract means.

6. The image processor as claimed in claim 1, wherein the quantization-inverse quantization means further includes control means for controlling a setting of a shifting direction and a bit shift number in the second shifting means.

7. The image processor as claimed in claim 1, wherein the look-up table means includes a plurality of look-up table devices for carrying out respective constant multiple multiplications.

8. The image processor as claimed in claim 7, further comprising switching means for connecting the look-up table devices or disconnecting the look-up table devices.

9. An image processing method for carrying out a compression and an expansion of image data, comprising:

a forward orthogonal transforming step for carrying out an orthogonal transform of image data for every data block to output first data;

a decoding step for decoding compressed data to output second data;

quantizing-inverse quantizing step for carrying out either a quantization of the first data using quantization steps according to frequency components in the coding to output third data or an inverse quantization of the second data using the quantization steps in the decoding to output fourth data;

a coding step for coding the third data to output compressed data; and an inverse orthogonal transforming step for carrying out an inverse orthogonal transform of the fourth data to output a decoded image;

the quantizing-inverse quantization step including a first shifting step for carrying out a predetermined bit number shift of input data fed to the quantizing-inverse quantizing step;

an add-subtract step for either adding or subtracting an output of the first shifting step to or from the input data;

a look-up table step for for storing multiplied input data by a multiple determined by the predetermined bit number shift of the first shifting step and the adding or the subtracting of the add-subtract step; and a second shifting step for carrying out a predetermined bit number shift of an output of either the add-subtract step or the look-up table step.

* * * * *